United States Patent [19]

Ledeen et al.

[11] 4,092,877
[45] June 6, 1978

[54] SELECTIVE MODE HANDWHEEL VALVE OPERATOR

[75] Inventors: Howard L. Ledeen, Pasadena; Franz Schmon, Granada Hills; Willem E. Tupker, Sylmar, all of Calif.

[73] Assignee: Ledeen Flow Control Systems Inc., Sun Valley, Calif.

[21] Appl. No.: 777,134

[22] Filed: Mar. 14, 1977

[51] Int. Cl.² ............................................. F16K 31/05
[52] U.S. Cl. ........................................ 74/625; 251/14
[58] Field of Search ................. 74/625, 483 R, 483 K, 74/552, 553; 251/14, 130

[56] References Cited

U.S. PATENT DOCUMENTS

| | | | |
|---|---|---|---|
| 2,861,473 | 11/1958 | Allman et al. | 74/625 |
| 3,217,604 | 11/1965 | Knox | 74/625 X |
| 3,309,942 | 3/1967 | Caldwell | 74/625 |

Primary Examiner—Frank T. Yost
Attorney, Agent, or Firm—Melvin R. Stidham

[57] ABSTRACT

The disclosure is of a selective-mode valve operator comprising a handwheel adapted to be mounted on a valve body with an output sleeve keyed onto the input shaft or stem of the valve. A motor may be mounted directly onto the handwheel, and locking means selectively lock the handwheel to the output sleeve or to a stationary member. When the handwheel is locked to the output sleeve, shift means prevent motor operation, and when it is locked against rotation the shift means enable motor operation. The shift means pass through a neutral condition whereby one mode is inactivated before the other mode is activated.

14 Claims, 9 Drawing Figures

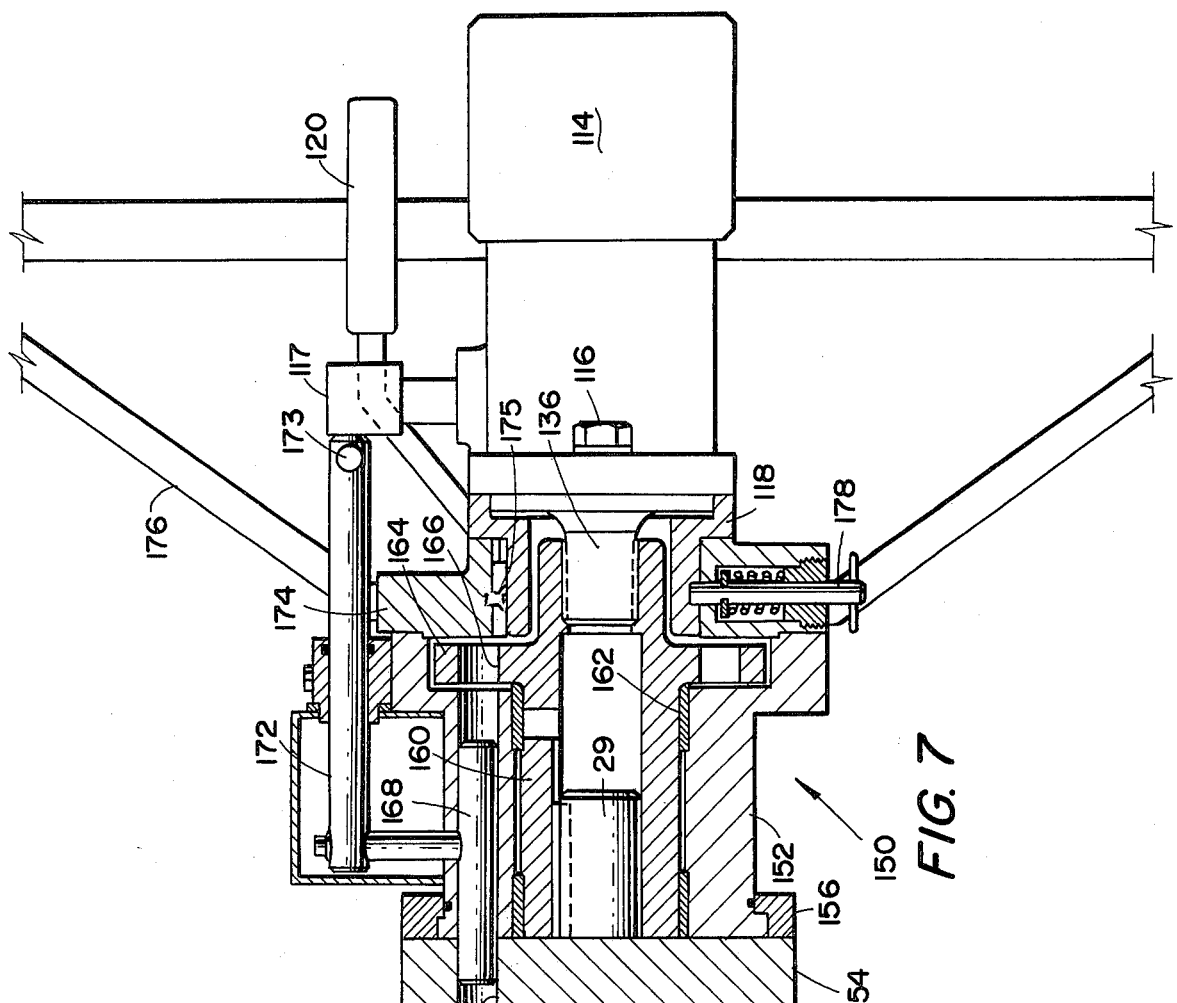
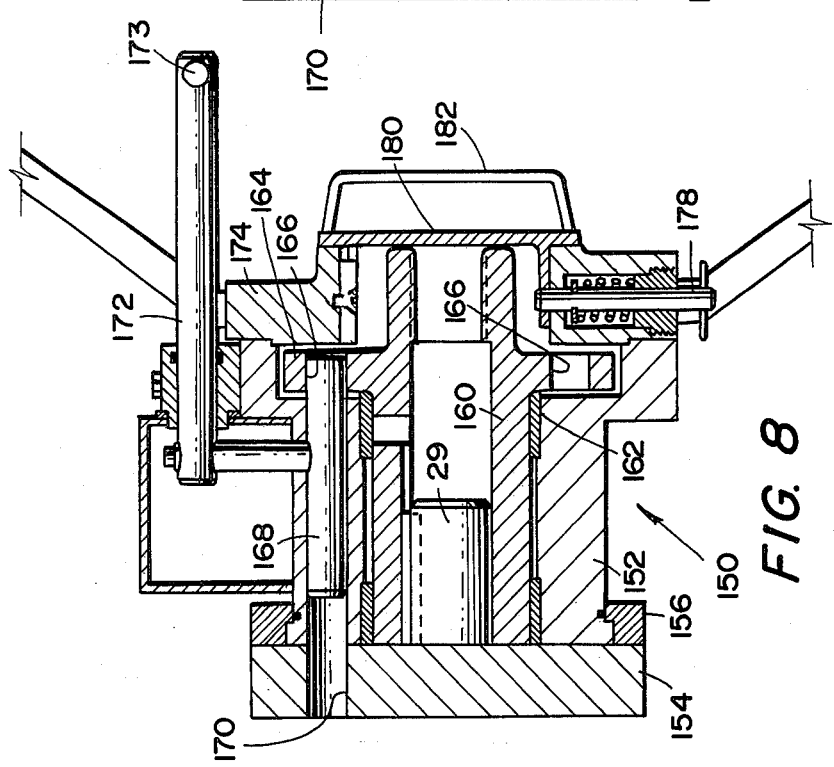

SELECTIVE MODE HANDWHEEL VALVE OPERATOR

BACKGROUND OF THE INVENTION

There are a number of powered valve operators available, and there are power operators which may be inactivated to enable manual operation. However, such systems usually require complex clutch mechanisms.

OBJECTS OF THE INVENTION

It is an object of this invention to provide a selective mode handwheel valve operator which may be quickly and easily converted to either manual or power operation.

It is a further object of this invention to provide a valve operator handwheel which may be operated under power by quick connection of hydraulic hoses or the like.

It is a further object of this invention to provide a selective mode valve operator which may be readily connected to existing valve structures.

It is a further object of this invention to provide a selective mode valve operator which is relatively inexpensive in cost but reliable in operation.

Other objects and advantages of this invention will become apparent from the description to follow, particularly when read in conjunction with the accompanying drawings.

BRIEF SUMMARY OF THE INVENTION

In carrying out this invention, there is provided a selective mode valve operator which includes a handwheel adapted to be mounted on a valve body, including an output sleeve which is keyed onto the valve stem or the input shaft of a gear operator for the valve. A hydraulic motor is adapted to be mounted directly onto the handwheel and a shiftable lock pin is provided to lock the handwheel selectively to either the output sleeve or to a stationary member. When the handwheel is locked to the output member means are provided to prevent motor operation. In one embodiment, small valve means carried by the pin blocks flow of the hydraulic fluid to the motor, and in a second embodiment, locking means for the pin prevents connection of hydraulic hoses to the motor. When the locking pin is engaged with a stationary member, it enables operation of the motor. In shifting, the locking pin passes through a neutral stage wherein one operating mode is inactivated before the other mode is enabled. In other embodiments, the motor is removable, and can be mounted on the handwheel only when the pin locks the handwheel to the stationary member.

BRIEF DESCRIPTION OF THE DRAWINGS

In the drawings:

FIGS. 7 and 8 are vertical section views of still another embodiment of this invention.

DESCRIPTION OF PREFERRED EMBODIMENTS

Figure 1:
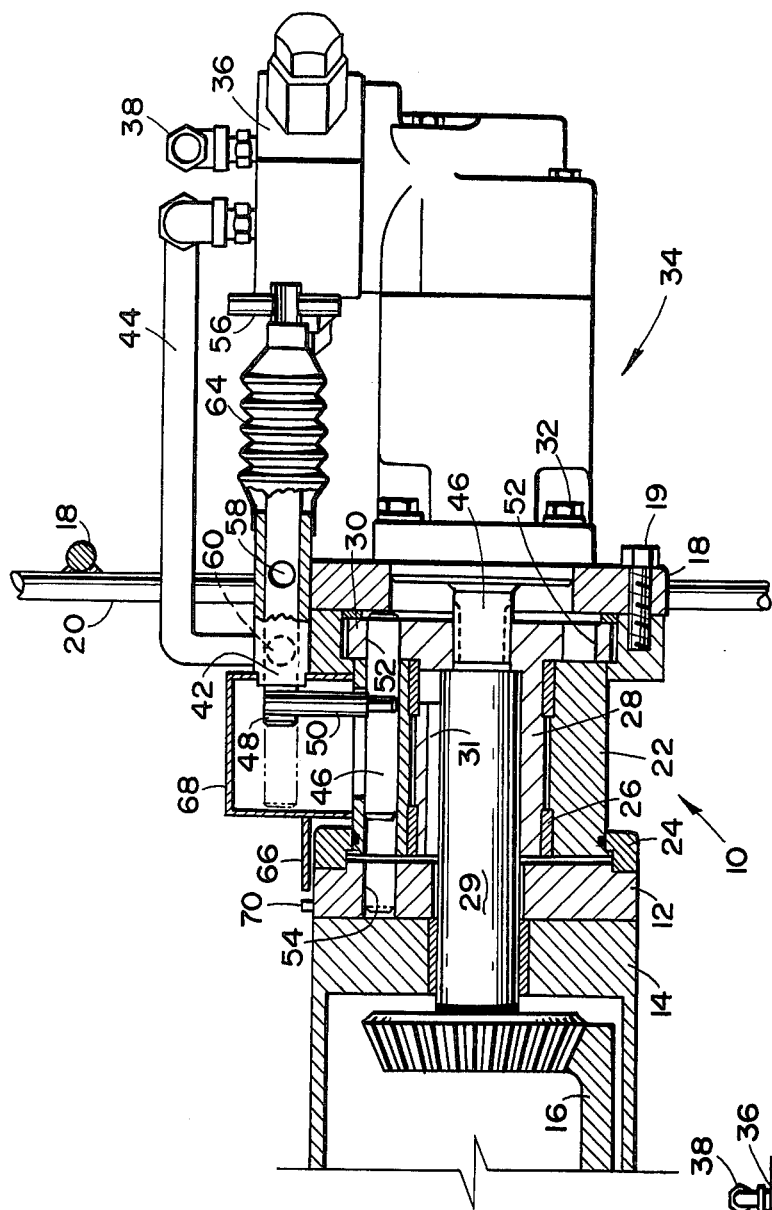
FIG. 1 is a vertical section view of one embodiment of this invention.
Figure 2:
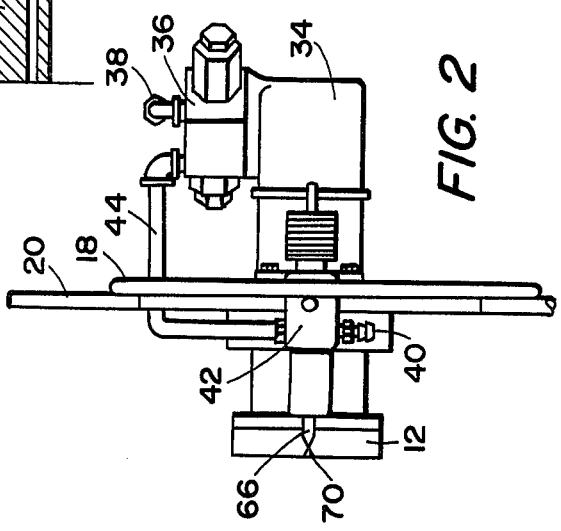
FIG. 2 is a top view of the embodiment of FIG. 1.

The Embodiment of FIGS. 1 and 2

The valve operator 10 of this invention may be mounted to drive a valve (not shown) as by mounting a stationary adaptor plate 12 to the housing 14 of a bevel gear operator 16 for opening and closing the valve.

The handwheel 18, including spokes 20, is carried on a transfer hub 22 by means of cap screws 19, the transfer hub, in turn, being retained by a split retainer ring 24 secured to the adaptor plate 12. The transfer hub 22 is rotatably carried, as by means of bushings 26, on an output sleeve 28 having an integral driving wheel or flange 30 thereon.

A hydraulic motor 34 is mounted on the handwheel hub by means of cap screws 32, and the motor manifold 36 is provided with suitable quick-disconnect couplers for attachment of hydraulic hoses, one coupler being shown at 38 and the other at 40 (FIG. 2) for flow direction through a block valve 42 and duct 44 for a purpose to be hereinafter described. The output shaft 46 of the hydraulic motor 34 is keyed or splined to the output sleeve 28 so that when the motor is energized, it drives the output sleeve 28 and, hence, the bevel gear operator 16 directly, through the valve input shaft 29 keyed at 31 to the output sleeve 28.

Slidably carried on the transfer hub 22 is a lock pin 46, which is shiftable, by means of a valve control rod 48 through a connecting rod 50, from the position shown in solid lines wherein it engages one of a series of openings 52 in the output sleeve flange 30, to a leftward position shown in phantom wherein it engages in a complementary opening 54 in the stationary adaptor plate 12. Hence, when the pin is shifted to the right, in the position shown in solid lines, it conditions the handwheel to drive the output sleeve directly, and when shifted to the left, it locks the handwheel against rotation to enable power drive.

The valve control rod 48 through which the locking pin is shifted by manipulation of the control rod handle 56 has a valve port 58 therethrough which, when the pin 46 is moved to its leftward position, aligns with the port 60 opening into the duct 44, thus enabling circulation of hydraulic fluid into the hydraulic motor manifold 36. On the other hand, when the pin is shifted to the right for manual operation, the valve port 60 is blocked, making motor operation impossible. It should be noted that the port 58 is so located on the control rod 48 that the locking pin 46 is disengaged from the output sleeve flange 30 and fully engaged with the stationary adapter plate 12 before the port 60 is uncovered. Hence, the manual mode is inactivated before power control is enabled. Conversely, when the pin is shifted back to the right the control valve rod 48 covers the port 60 before the pin 46 engages in the opening 52 of the output sleeve flange 30.

A bellows cover 64 is secured between the control rod 48 and the valve housing 42. And a pointer 66, which may be carried on any part of the transfer hub 22, such as the control pin housing 68 aligns with a marker 70 on the adaptor plate 12 to ensure alignment of the locking pin 46 with its complementary opening 54 in the adapter plate 12.

Figure 3:
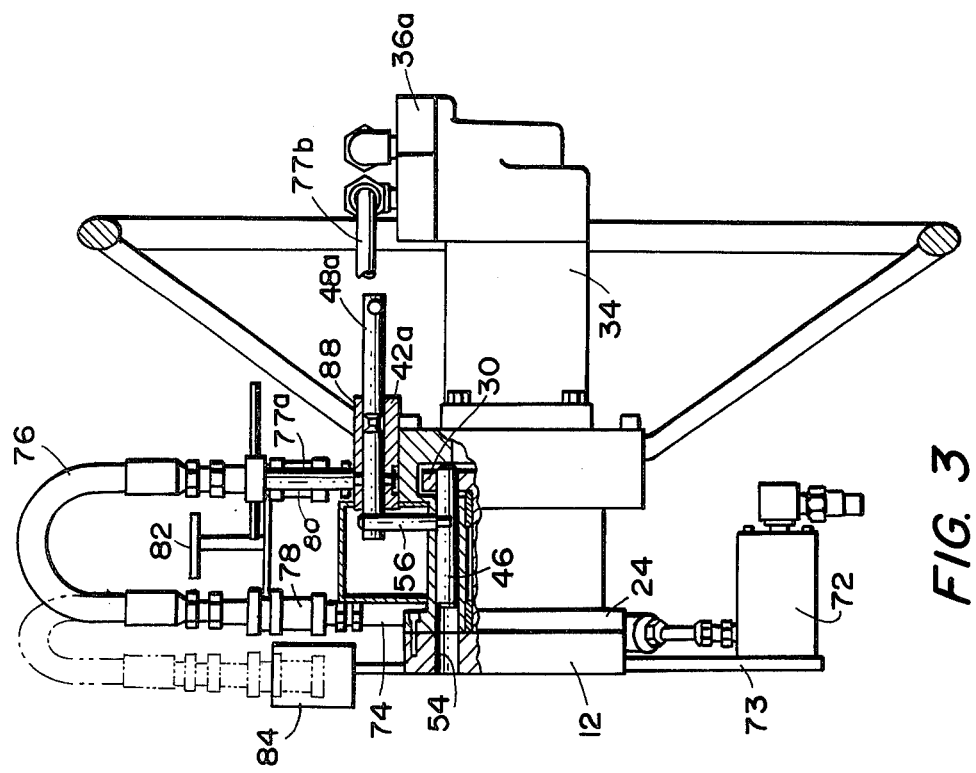
FIG. 3 is a side view, partially in section of a second embodiment of this invention.

The Embodiment of FIGS. 3 and 4

In this embodiment, the lock pin 46 is also shifted between the manual operation mode, shown in FIG. 3 to a power mode wherein it engages in a socket 54 in the stationary adapter plate 12. Hydraulic fluid is introduced to the motor 34 from a permanent or portable power supply (not shown) to a manifold supported at 73 from the adapter plate 12. From the vertical tubing 74 and disconnectable U-tube, hydraulic fluid is transmitted through the housing duct 77a and then through lines 77b to the manifold 36a of the hydraulic motor 34.

For power drive only, rigid U-tubes 76 complete the connection to the housing 42a as shown in solid lines, by means of quick-disconnect couplings 78 and 80. For manual operation, the couplings 78 and 80 are disconnected through manipulation of a common grip handle 82, and connection 78 only, may again be completed just to hold the U-tube 76, with the coupling 80 received in protective cup 84.

Figure 4A:
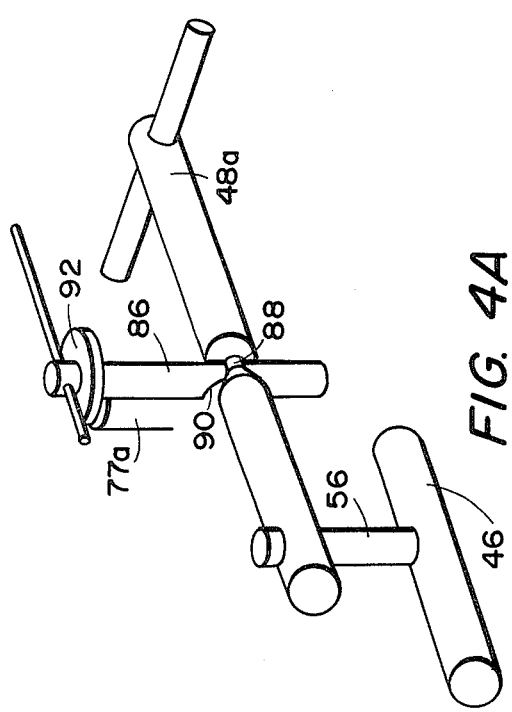
FIGS. 4A and 4B are views in perspective of the locking mechanism of FIG. 3.
Figure 4B:
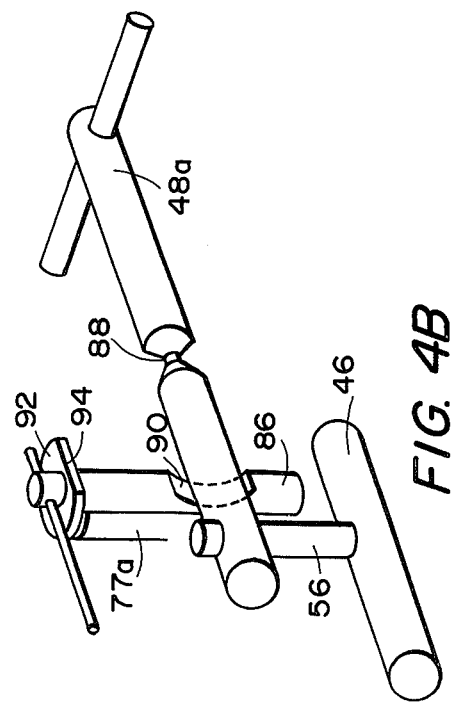

Referring more particularly to FIGS. 4A and 4B, the shift rod 48a is secured in its forward, power mode by engagement of a safety release pin 86 in a reduced diameter portion 88 around the shift rod 48a. A notch 90 in the safety release pin 86 enables movement of the shift rod 48a when the release pin 86 is turned through 180° to the position shown in FIG. 4B. However, in this position engagement of the shift rod 48a against the wall of the notch 90 prevents turning the release pin 86.

Carried on the top of safety release pin 86 is an interference plate 92 with a segment thereof removed at 94. When the pin 86 is in the position shown in FIG. 4B the interference plate 92 overlies the stationary component 77a of the quick-disconnect coupling 80 to prevent completion of the hydraulic circuit for power operation. However, when turned through 180° to the position of FIG. 4A the coupling component 77a is cleared from attachment of the U-tubes 76.

Hence, when the shift rod 48a is in the position shown in FIG. 4B the lock pin 46 is engaged for manual drive and connection of hose couplings is prevented, and in order to turn the release pin 86 to free the coupling 80a for power drive, the lock pin 48a must be moved to the position shown in FIG. 4A, preventing manual operation.

Figure 5:
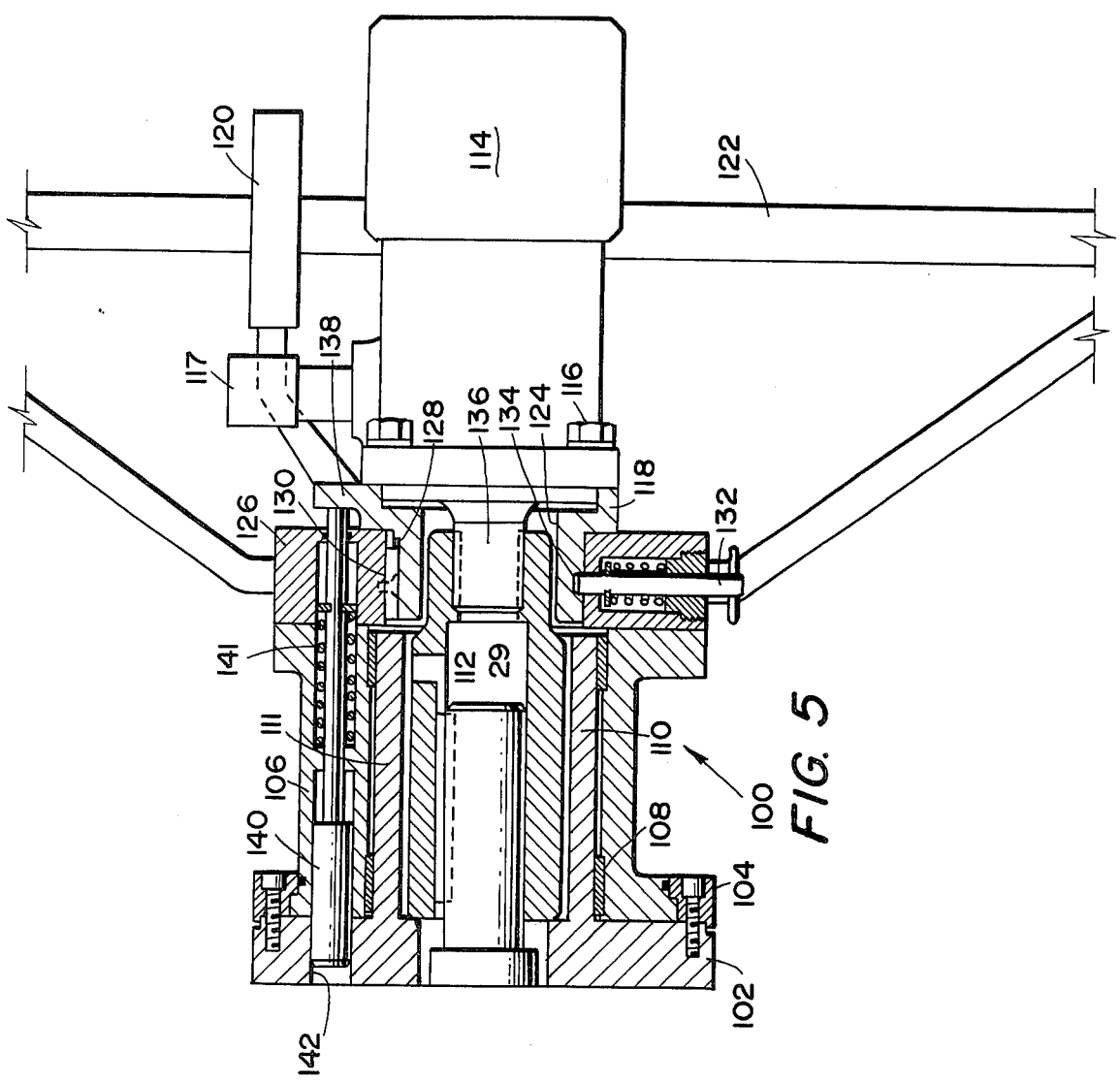
FIGS. 5 and 6 are vertical section views of a third embodiment of this invention.
Figure 6:
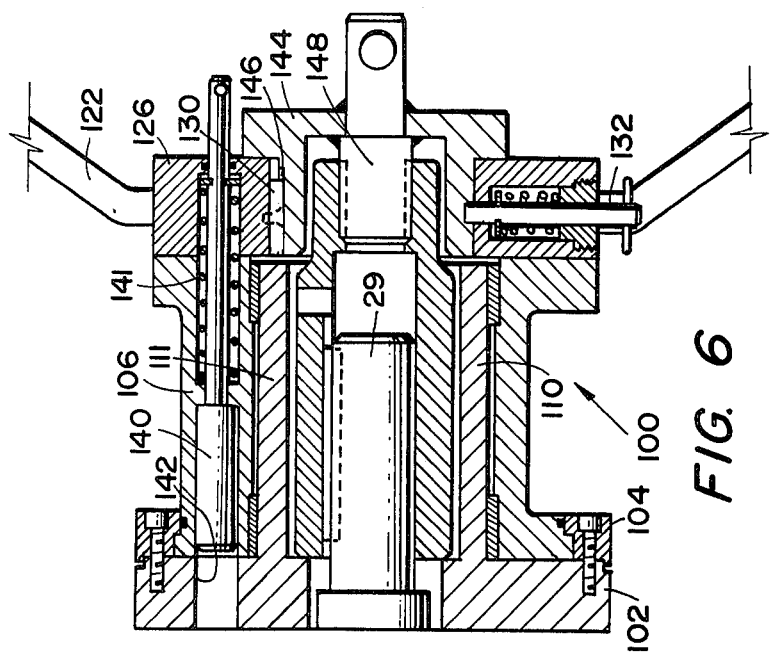

The Embodiment of FIGS. 5 and 6

In this embodiment, the operator 100 is mounted to a stationary adaptor plate 102 by means of a split retainer ring 104. The transfer hub 106 is rotatably carried on suitable bushings 108 on a tubular extension 110 of the adaptor plate 102. The output sleeve 111 is rotatable in the tubular extension and is keyed at 112 to the input shaft 29 of the valve or valve operator (not shown).

In this embodiment, the hydraulic motor 114 with couplings 117 for hydraulic hoses, is removable and is secured, as by means of cap screws 116 to an engagement sleeve 118 with a suitable handle 120 being provided to facilitate handling.

For power operation, the motor 114 together with the engagement sleeve 118 is inserted into the central opening 124 in the handwheel hub 126, whereby a keyway 128 in the engagement sleeve, engages a key 130 secured in the handwheel hub. A spring-biased retainer pin 132 is received in a socket 134 in the sleeve to prevent inadvertent removal.

With the engagement sleeve 118 fully engaged in the handwheel hub 126, splines on the motor output shaft 136 engage complementary splines in the output sleeve 111 to effect positive drive. However, prior to such positive engagement, a lug or flange 138 on the engagement sleeve depresses a spring-biased lock pin, pushing it into a complementary socket 142 in the adapter plate 102, thereby locking the transfer hub 106 and handwheel 122 against rotation.

Hence, when the motor 114 is in place as shown in FIG. 5 the handwheel 122 is locked against rotation by reason of engagement of lock pin 140. Similarly, engagement of the keyway 128 of the engagement sleeve 118 anchors the motor 114 to enable direct drive of the output sleeve 110 and valve input shaft 29 by the splined motor output shaft 136 when hydraulic hoses are connected to their respective quick-disconnect couplings 117.

For manual drive, the motor is removed, simply by pulling the spring biased retaining pin 132 and withdrawing the motor with engagement sleeve 118, by grasping the handle 120. This allows the spring 141 to bias the lock pin to the rightward position, as shown in FIG. 6, free of the receptacle 142, thereby releasing the transfer hub 106 for rotation. Then, a manual operation engagement sleeve 144 is inserted into the hub 126 with a keyway 146 therein engaging the fixed key 130. The manual engagement sleeve carries a splined stub 148 welded thereto to effect positive drive engagement with the output sleeve 111. Hence, in this position, with the lock pin 140 freeing the handwheel 122 for rotation, positive drive of the valve input shaft 29 is effected from the handwheel 122 to the hub 126, keyway 146, manual engagement sleeve 144 and splined stub 148 to the output sleeve 111.

The Embodiment of FIGS. 7 and 8

In this embodiment also, the motor 114 is secured to an engagement sleeve 118 by means of cap screws 116 and carries quick disconnect couplings 117 for attachment of hydraulic hoses (not shown).

In the operator itself 150, the transfer hub 152 is held in place on the stationary adaptor plate 154 as by means of a split retainer ring 156. The output sleeve 160, in driving engagement with the valve input shaft 29, is rotatable within the transfer hub 152 on bushings 162. As in the embodiment of FIG. 1, a flange 164 on the output sleeve 160 has an annular series of openings 166 for driving engagement with a lock pin 168 slidable in the transfer hub 152, the lock pin also being engagable with a receptacle 170 in the stationary adaptor plate 154 to lock up the transfer hub 152 for motor drive. The lock pin 168 is shiftable between its axial outward manual driving position shown in FIG. 8 and the inward power driving position shown in FIG. 7, by means of a shifting rod 172 with handle 173.

In power mode, the adaptor sleeve 118 engages in the hub 174 of the handwheel 178 to drive it through a key 175, the hub being retained by a spring-biased retainer pin 178. When so engaged, the splined output shaft 136 is in positive driving engagement with the output sleeve 160 and, hence, the valve input shaft 29. Also when so engaged, the quick-disconnect couplings 117 on the motor 114 are positioned so that they engage the shift pin handle 173 to ensure that the transfer hub 152 is locked to the adaptor plate 154.

For manual operation, the motor 114 is removed and replaced by a cover 180 having a handle 182, the cover playing no part in the driving mechanism. With the motor removed, the shifting rod 172 may be pulled to the right to the position shown in FIG. 8 to effect direct engagement of the transfer hub 152 to the output sleeve 160 through lock pin 168.

While this invention has been described in conjunction with preferred embodiments thereof, it is obvious that modifications and changes therein may be made by those skilled in the art without departing from the spirit and scope of this invention, as defined by the claims appended hereto.

What is claimed is:

1. A selective mode valve operator comprising:
   a stationary member adapted to be mounted on a valve body;
   an output sleeve rotatable on said stationary member;
   means on said output sleeve adapting it for rotary driving connection to a valve operating input shaft;
   a handwheel coaxial with said output sleeve;
   a hub extension on said handwheel;
   a rotary motor drive having an output shaft adapted when activated for driving engagement with said output sleeve;
   shift means for selectively locking said handwheel to one of said stationary member and said output sleeve; and
   means preventing driving operation of said rotary motor when said handwheel is locked to said output sleeve.

2. The selective mode valve operator defined by claim 1 wherein:
   said last-names means is effective before said shift means locks said handwheel to said output sleeve.

3. The selective mode valve operator defined by claim 1 wherein said shift means comprise:
   a locking pin slidable on said handwheel parallel to the axis thereof;
   a socket on said stationary member engagable by said locking pin when said pin is in a first, locking position; and
   means on said locking pin enabling operation of said motor when said locking pin is in said first position but disabling said motor when said locking pin is in a second, freeing position.

4. The selective mode valve operator defined by claim 3 wherein said motor is fluid operated and said last-named means comprises:
   blocking means carried by said locking pin preventing delivery of fluid to said motor when said locking pin is in said second position.

5. The selective valve operator defined by claim 4 including:
   a valve housing mounted on said handwheel; and
   a pressure fluid duct for said motor connected to said valve housing;
   said blocking means comprising;
   valve closure member movable in said valve housing;
   said valve closure being positioned in flow blocking means when said locking pin is in said second position.

6. The selective mode valve operator defined by claim 3 wherein said last-named means comprises:
   means to prevent mounting said motor on said handwheel when said locking pin is in said second position.

7. The selective mode operator defined by claim 3 including:
   means for locking said handwheel to said output sleeve when said locking pin is in its second position.

8. The selective mode operator defined by claim 3 including:
   a flange on said output sleeve, and
   a receptacle on said flange engagable by said locking pin in said second position to couple said handwheel to said output sleeve.

9. The selective mode valve operator defined by claim 1 wherein:
   said motor drive is removably mounted on said handwheel; and said shift means comprises:
   a locking pin slidable on said handwheel parallel to the axis thereof;
   a socket on said stationary member engagable by said locking pin when said pin is in a first locking position; and
   means on said motor when mounted on said handwheel preventing movement of said locking pin from said first position.

10. The selective mode valve operator defined by claim 9 including:
    biasing means urging said locking pin to a second position free of engagement in said socket.

11. The selective mode valve operator defined by claim 9 wherein the output shaft of said motor is drivingly engaged with said output sleeve when mounted on said handwheel and including:
    a first rotary motion transmitting member;
    releasable means securing said motion transmitting member coaxially on said handwheel when said motor is removed therefrom; and
    a complementary drive shaft, carried coaxially on said motion transmitting member and being adapted for driving engagement with said output sleeve.

12. The selective mode valve operator defined by claim 1 wherein said shift means comprises:
    a locking pin slidable on said handwheel parallel to the axis thereof:
    a radial flange on said output sleeve;
    a first receptacle on said flange adapted to receive said locking pin when moved in one direction;
    a second receptacle in said stationary member adapted to receive said locking pin when moved in the other direction.

13. The selective mode valve operator defined by claim 12 including:
    means enabling driving engagement of said motor drive with said output sleeve when said locking pin is moved fully in said other direction.

14. The selective mode valve operator defined by claim 13 wherein said motor is hydraulically driven and including:
    a hydraulic line connecting a source of pressure fluid to said motor;
    a slide valve in said line;
    said slide valve being operated by said locking pin to be moved to an open position when said locking pin is moved in said other direction.

* * * * *